C. G. BRANSTRATOR.
POWER TRANSMISSION FOR DRIVEN MECHANISMS.
APPLICATION FILED AUG. 24, 1917.
1,292,694.
Patented Jan. 28, 1919.
3 SHEETS—SHEET 1.
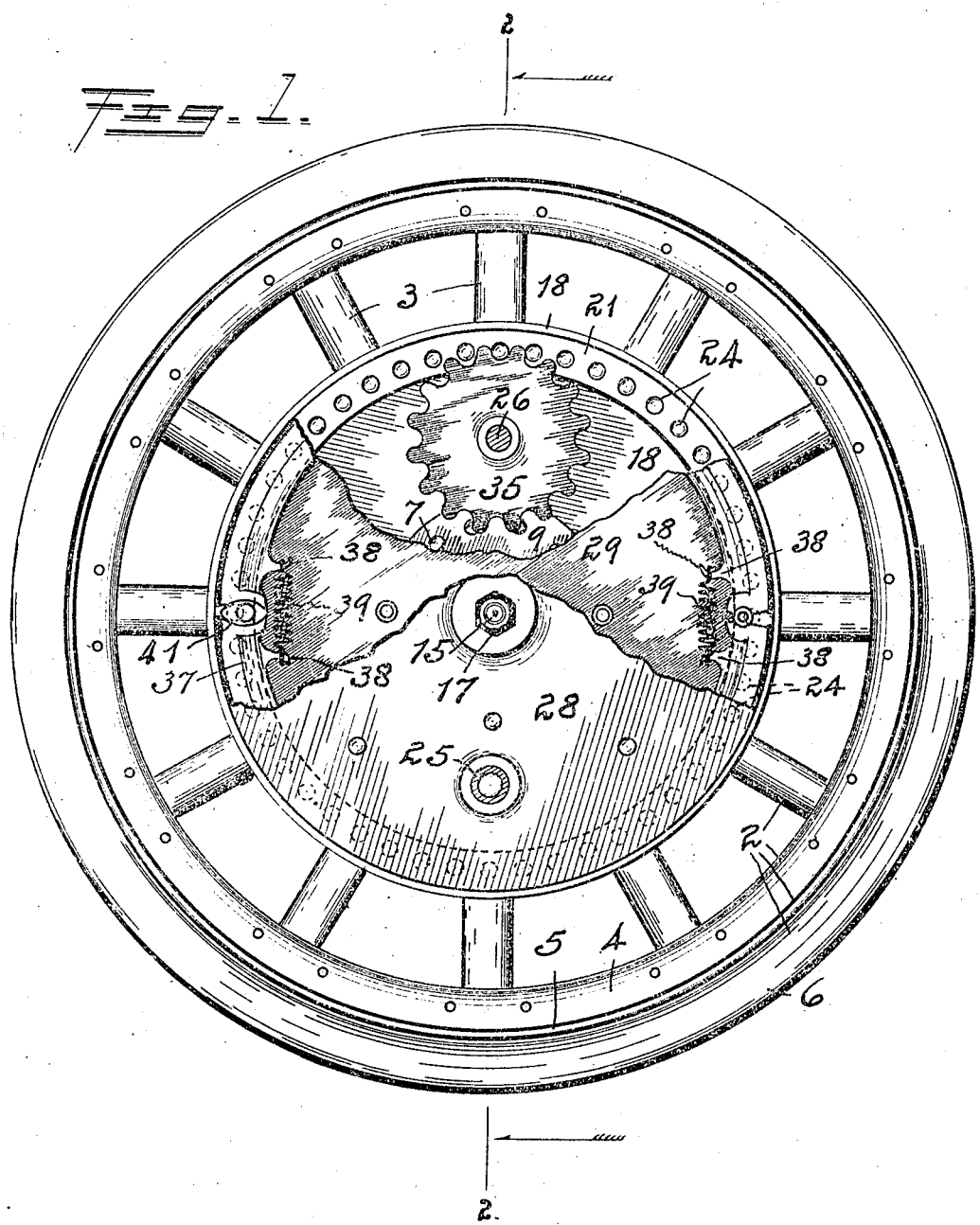

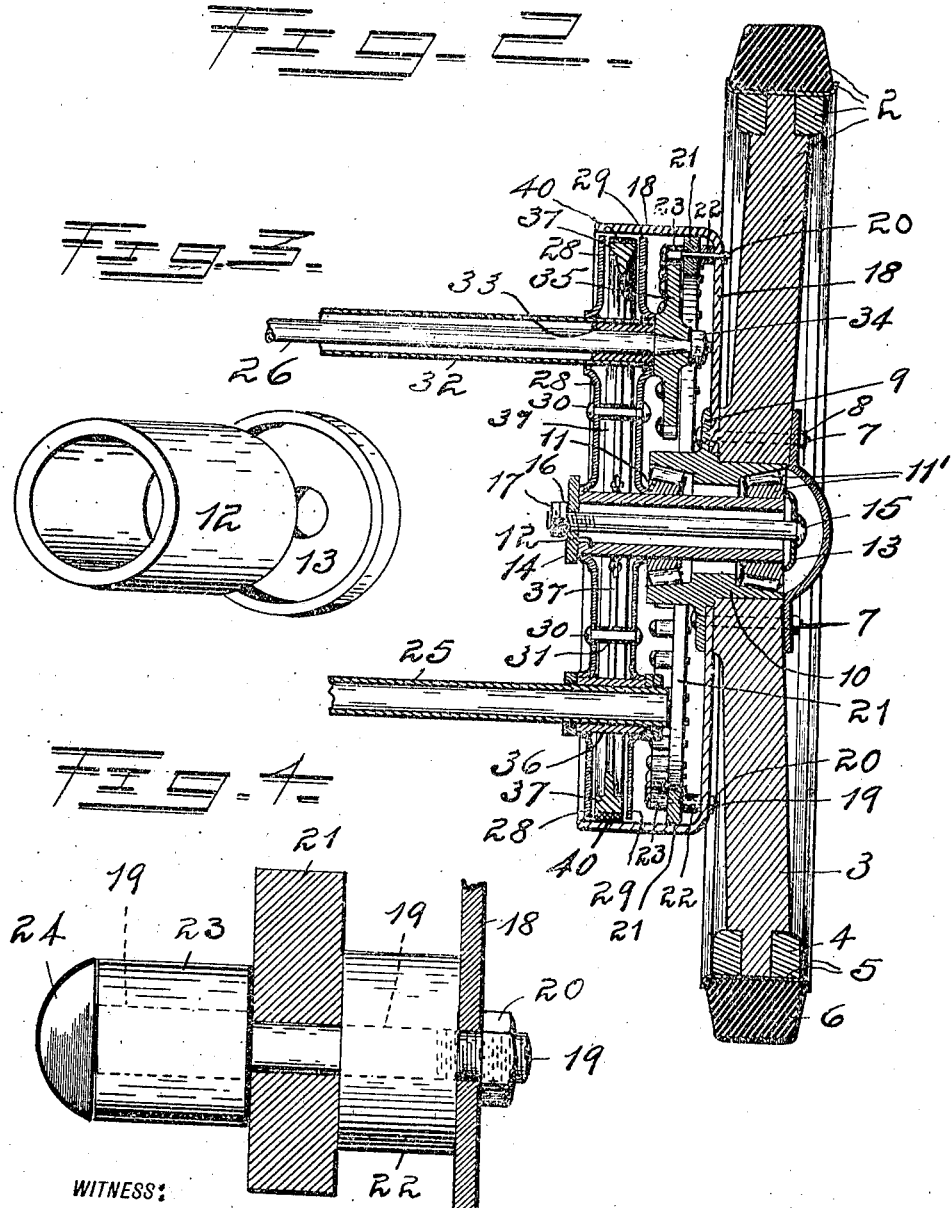

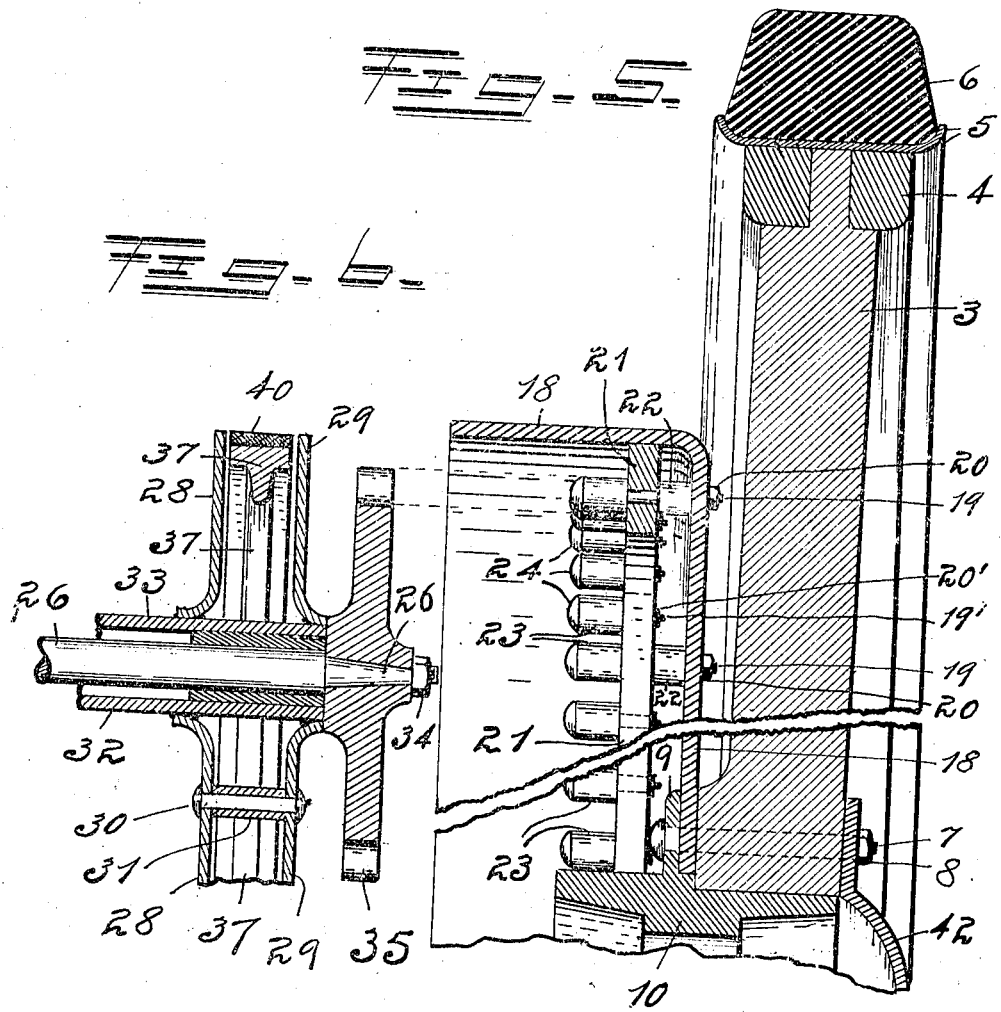

UNITED STATES PATENT OFFICE.

CLEM G. BRANSTRATOR, OF MONMOUTH, ILLINOIS, ASSIGNOR TO SVEND J. BECK, OF DAVENPORT, IOWA.

POWER TRANSMISSION FOR DRIVEN MECHANISMS.

1,292,694.   Specification of Letters Patent.   Patented Jan. 28, 1919.

Application filed August 24, 1917.   Serial No. 188,056.

*To all whom it may concern:*

Be it known that I, CLEM G. BRANSTRATOR, a citizen of the United States, and a resident of Monmouth, in the county of Warren and State of Illinois, have invented a new and useful Power Transmission for Driven Mechanisms, of which the following is a specification.

My invention relates to means for transmitting power from an engine to a driven mechanism, such as a truck or other vehicle, and it consists, substantially, in the improvements herein described.

One of the objects of the invention is to provide a novel internal gear.

Another object is to provide novel means whereby the supporting and driving wheel may be quickly detached from the vehicle.

Another object is to provide a novel housing for the gear, whereby the latter is so thoroughly inclosed that it is practically impossible for dust and the like to reach it.

Numerous subsidiary objects will appear. Some of these will be obvious and others particularly pointed out.

In the accompanying drawings, which illustrate a preferred embodiment of my invention:

Figure 1 is a face or side elevation, partly broken away and partly in section, of a wheel in which my improvements are incorporated;

Fig. 2, a vertical transverse section, taken in the plane of the line 2—2 in Fig. 1;

Fig. 3, an enlarged detail perspective of the tubular axle and the roller-bearing cap;

Fig. 4, an enlarged side elevation of one of the gear-rollers and adjacent parts;

Fig. 5, an enlarged fragmental section, broken in two, of the wheel and the removable parts of the power transmission devices; and Fig. 6, a similar view of those parts of the transmission devices which remain on the vehicle when the parts shown in Fig. 5 are removed, this figure and Fig. 5 showing the manner of removing the wheel.

Considering the drawings in detail and referring to the elements and, where necessary, to the parts thereof, each by a distinguishing reference numeral, uniformly employed, 2 indicates a combined driving and supporting wheel including spokes 3, felly 4, rim 5 and tire 6, either or all of which may be of any suitable construction.

The inner ends of the spokes are secured by bolts and nuts 7 and 8 respectively, to the annular peripheral flange 9 of a hub 10 which is mounted on a pair of oppositely arranged roller bearing units 11, 11' slidable on a tubular axle 12. 13 designates a cap and 14 a disk, these being disposed respectively on the outer and inner ends of the axle 12 and provided with registering apertures which receive a wheel-retaining bolt 15 which is engaged by an adjusting-nut 16 and a lock-nut 17, the purposes of which will presently be more fully described. 18 denotes a cup-shaped housing-shell having a central aperture in which the hub 10 seats. The bolts 7 pass through its wall, adjacent said opening, and thus secure it to the wheel-hub and spokes. Secured to the shell 18 by bolts 19 and nuts 20 is a roller-carrying ring 21. A spacer 22 is mounted on each bolt 19 intermediate the base of the shell 18 and the ring. The stem of each of these bolts extends inwardly through the ring 21 and on it is mounted a roller 23 which is held by the head 24 of its coacting bolt 19, said head and roller being preferably of the same circumference. Shorter bolts, 19', pass through the ring 21 and are secured thereto by nuts 20'. Any of these may of course be extended to pass through the shell 18; and any suitable means other than the bolts 19 and nuts 20 may be employed to secure the ring to the shell, the main object in securing them as shown being to prevent weakening of the ring by cutting unnecessary holes therein and to save the expense incurred thereby and by using additional securing means.

25 designates the "dead" or supporting axle, and 26 denotes the drive-shaft, to which power is transmitted from the motor (not shown) by any suitable means. A brake housing comprising opposed disks 28 and 29 is secured together by rivets 30 or the like, the disks being held at suitable distances apart by spacers 31. The disks are provided with registering apertures in which seats an elongated hub or housing 32 preferably secured to the disks by electro-welding.

The shaft 26 is journaled in a bushing-bearing 33 in said housing and on its tapered end is fixed by a nut 34 a driving-spur 35. The supporting axle 25 is seated in a sleeve or collar 36 preferably secured by electro-welding to the walls of registering apertures in the disks 28 and 29.

37, 37 designate coacting sections of a brake (Fig. 1) having fingers 38. 39, 39 indicate retractile springs the respective ends of each of which engage the adjacent fingers of the brake-sections to hold the brake normally in inoperative position. 40, 40 indicate the brake-lining sections. Cams 41 which may be operated in any suitable manner, are employed to expand the brake-sections to thereby throw the lining-sections into engagement with the interior face of the flange of the shell 18. Any other suitable type or character of brake may be employed.

42 indicates a cap secured by the bolts 7 and nuts 8 to the spokes 3 and purposed to prevent any foreign substances getting to the bearings or to any other part of the mechanism. It and the base of the shell 18 effectually prevent the entrance of dust from the relatively outer face or side of the entire device, the flange of the shell prevents its entrance from the edges thereof, and the disks 14 and 28 as effectively prevent the entrance of injurious substances from the relatively inner face of the device.

One of the objections to chainless and interior-driven types of power-transmission devices of this nature has heretofore been that both removal and replacement of the wheel necessitated a relatively large amount of time being employed. This is wholly obviated in my device, for mere removal of the nuts 16 and 17 permits the parts shown in Fig. 5 to be freely drawn off from those shown in Fig. 6.

Adjustments of the bearings 11 and 11' may be quickly made by means of the nut 16, for the former is held stationary by the disk 29 and the latter is borne against upon by the flange of the cap 13 which is movable by pressure of the head of the bolt 15.

Upon power being applied in any suitable manner to rotate the axle 26 the movement of the latter—forward or reverse—will be imparted to the spur-wheel 35 the teeth of which strike and drive the rollers 23 and thereby the ring 21, and as this is fixed to the shell 18 and it to the wheel 2 the latter will be actuated.

It has not been thought necessary to encumber this specification and the accompanying drawing with descriptions and illustrations of modifications which are neither essential to nor form any part of the invention and which embody merely mechanical skill. Therefore I do not consider myself as limited to the specific form herein shown and described except as pointed out in the following claims, wherein it is my intention to claim as broadly as is permitted by the state of the art all the novelty inherent in the invention.

I therefore claim as new the following, to-wit:

1. Combined in a device of the nature described, a vehicle-supporting wheel, a transmission-ring secured thereto, means for actuating said ring, a brake, and a single bolt and a nut engaging it whereby to hold the brake in operative position relative to the other recited elements.

2. Combined in a device of the nature described, a vehicle-supporting wheel, a hollow axle on which it is rotatorily mounted, a housing-shell fixed to the wheel, a transmission-ring fixed to said shell, a brake, a casing inclosing it and constituting a closure for one end of the shell, and a single bolt and a nut whereby said elements are operatively connected.

3. In a device of the nature described, a vehicle-supporting wheel including a hub, a hollow axle around which said wheel rotates, transmission devices secured to the wheel, a transmission device for driving the one first recited, and means coöperating with said hollow axle for holding the several transmission devices in operative engagement.

4. In a device of the nature described, a vehicle-supporting wheel, a housing-shell secured thereto and having a laterally extending annular flange, a transmission-ring within said shell, an axially disposed annular series of rollers connected with said ring, and means for impelling them and thereby imparting rotary movement to the ring.

5. In a device of the nature described, a vehicle-supporting wheel, a housing-shell secured thereto and having a laterally extending annular flange, a transmission ring within said shell, an axially disposed annular series of rollers connected with said ring, a spur-wheel for driving said series of rollers, and a drive shaft for actuating the spur-wheel.

6. In a device of the nature described, a vehicle-supporting wheel, a housing-shell secured thereto and having a laterally extending flange, a transmission-ring within and driving said shell, an annular series of roller-carrying elements secured to said ring, rollers secured one on each of said roller-carrying elements, a spur-wheel for driving said series of rollers, and means for actuating the spur-wheel.

7. In a device of the nature described, a vehicle-supporting wheel, a housing-shell secured thereto and having a laterally projecting flange, a transmission ring within said shell, an axially disposed annular series of rollers, means for connecting a portion of said rollers with said ring, means for connecting a portion of the rollers with said ring and shell, and means for imparting rotary movement to said ring.

8. In a device of the nature described, a pair of spaced, united disks provided with centrally arranged registering apertures, a brake arranged between said disks, an axle held from rotation in said apertures, a housing shell within which said disks are disposed, a drive-shaft having a bearing in registering apertures in said disks, a drive-wheel fixed on said shaft, a supporting-wheel rotatorily mounted on said axle, a transmission device secured to said supporting-wheel and driven by said drive-wheel, and means for removably connecting the drive-wheel with said transmission device.

9. In a device of the nature described, a pair of spaced, united disks provided with centrally arranged registering apertures, a brake arranged between said disks, an axle held from rotation in said apertures, a housing shell within which said disks are disposed, a drive-shaft having a bearing in registering apertures in said disks, a drive-wheel fixed on said shaft, a dead axle for supporting said disks, a supporting-wheel rotatorily mounted on said axle, a transmission device secured to said supporting-wheel and driven by said drive-wheel, and means for removably connecting the drive-wheel with said transmission device.

10. In a device of the nature described, a housing-shell having a laterally projecting annular flange, a vehicle-wheel including a hub secured to said shell, bearings on which the hub rotates, a hollow axle on which said bearings are secured, transmission devices arranged within said shell, for driving said wheel, a brake-housing constituting a closure for the open end of the shell, a brake within the housing, a cap-plate closing the outer end of the hub, a cap-plate closing its inner end, a bolt connecting said plates, passing through the axle, and connecting the shell-closure to the shell, and a nut for securing the bolt in place.

11. In a device of the nature described, a housing-shell having a laterally projecting annular flange, a vehicle-wheel including a hub secured to said shell, bearings on which the hub rotates, a hollow axle on which said bearings are secured, transmission devices arranged within said shell, for driving said wheel, a brake-housing constituting a closure for the open end of the shell, a brake within the housing, a cap-plate closing the outer end of the hub, a cap-plate closing its inner end, a bolt connecting said plates, passing through the axle, connecting the shell-closure to the shell, and a nut for securing the bolt in place, and a cap secured on the outer face of the wheel and preventing access of dust to said bearings.

12. In combination, a vehicle-supporting wheel, transmission devices secured thereto, a drive-shaft, transmission devices fixed thereto and adapted to drive those first recited, a plural-part housing in which said several transmission devices are located, and a single bolt passing through the wheel-hub and a nut thereon for holding the parts of the housing in position, removal of the nut from the bolt permitting withdrawal of the latter through the wheel-hub.

13. In combination, a vehicle-supporting wheel, an annular element rotatable therewith whereby to drive it, a series of rollers carried by said annular element and arranged axially thereof, and means for imparting rotary movement to said series.

14. In combination, a vehicle-supporting wheel, an annular element secured thereto whereby to drive it, a series of rollers carried by said annular element and arranged axially thereof, means for imparting movement to said series, and means for inclosing the last recited element and also said series.

15. In combination, a vehicle-wheel including a hub, a hollow axle for the hub, transmission devices secured to the hub, a drive shaft, transmission devices driven thereby and driving the transmission devices first recited, and means including a single bolt passing through the axle, for removably holding the several transmission devices in operative engagement.

16. In a device of the nature described, a housing-shell having a laterally extending flange, a brake-housing disposed partly within the shell and constituting a closure for its open end, a brake within the brake-housing, a transmission-ring within the shell, a drive-wheel, also within the shell, for driving said ring, a drive-shaft penetrating the brake-housing for driving said drive-wheel, a dead-axle penetrating and supporting the brake-housing, and a vehicle-supporting wheel driven by said shell.

17. In a device of the nature described, a brake-housing comprising annular spaced disks having centrally disposed registering apertures, an axle disposed in said apertures and welded to said disks, a drive-shaft passing through said disks, a housing therefor, welded to said disks, a dead axle supporting said disks, a housing-shell for which one of said disks forms a closure, a wheel fixed to said shell, and transmission devices disposed in said shell, driven by said shaft and driving the shell and thereby said wheel.

In witness whereof I hereunto affix my signature, this 16th day of August, 1917, at Galesburg, Illinois.

CLEM G. BRANSTKATOR.